UNITED STATES PATENT OFFICE.

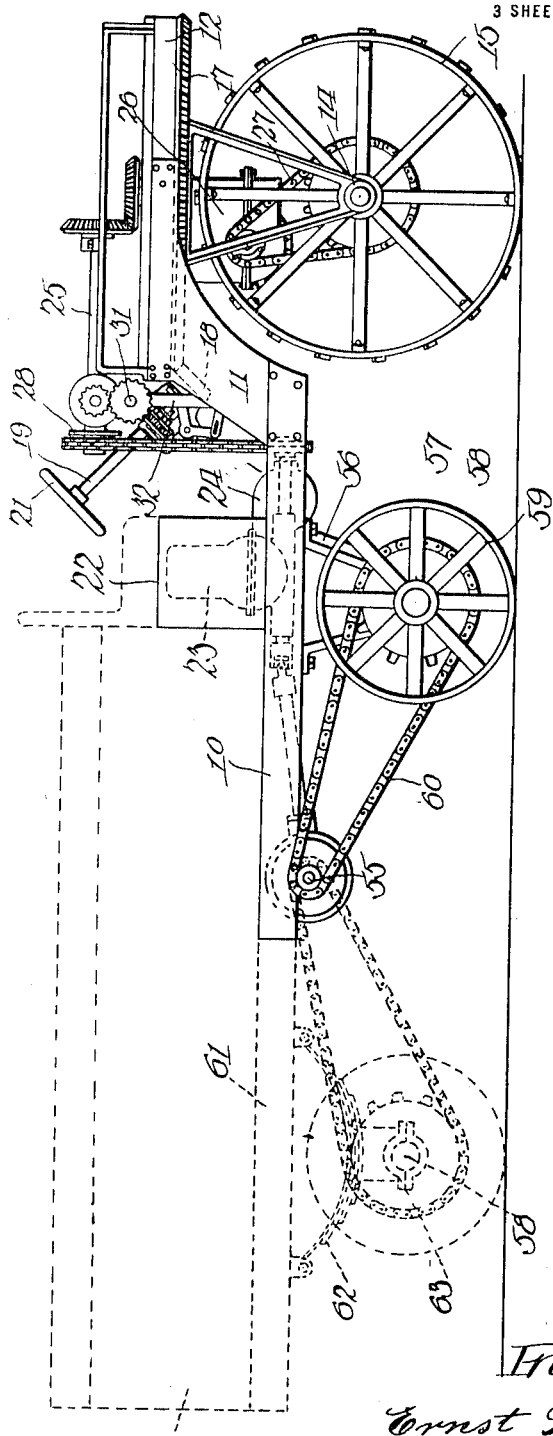

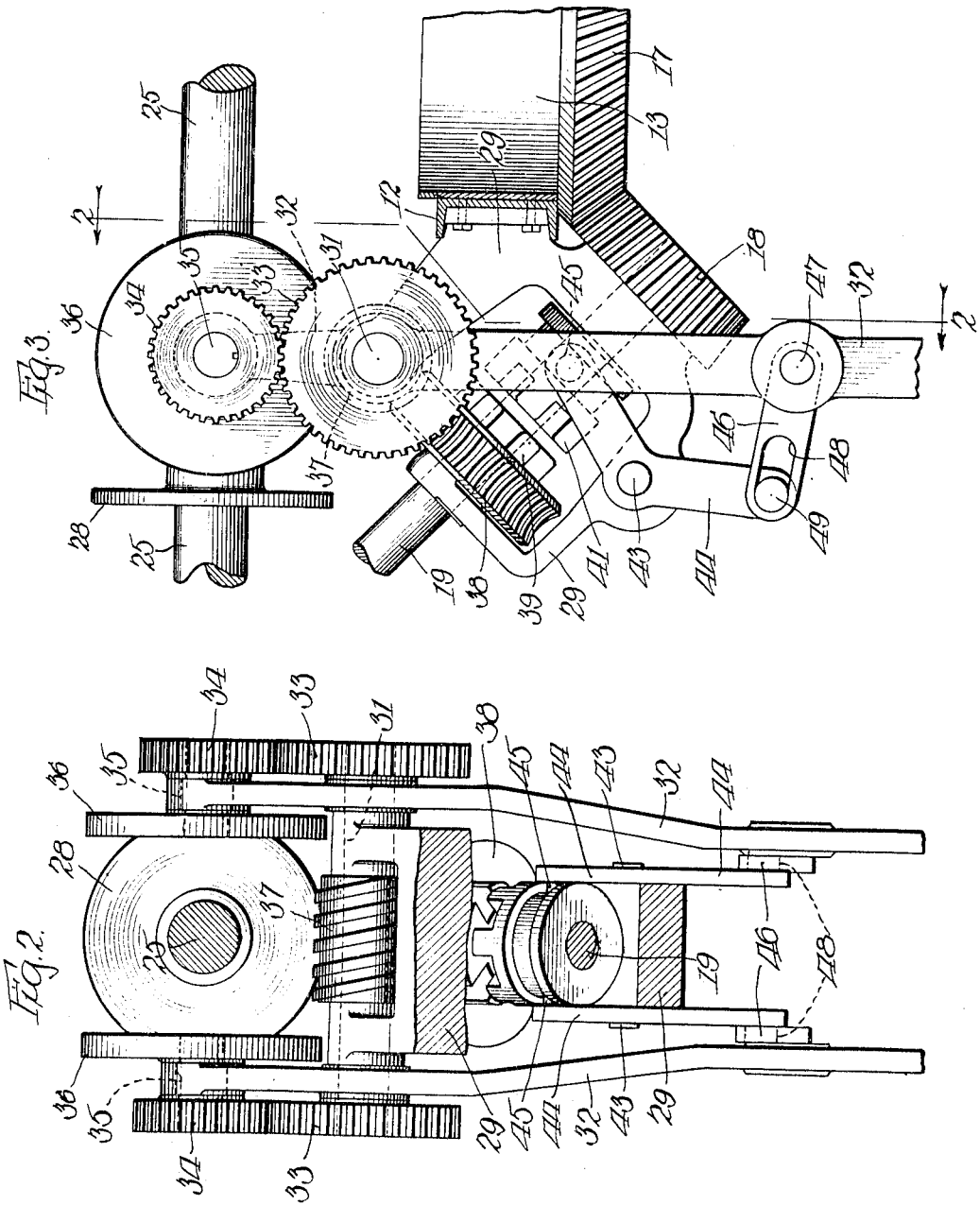

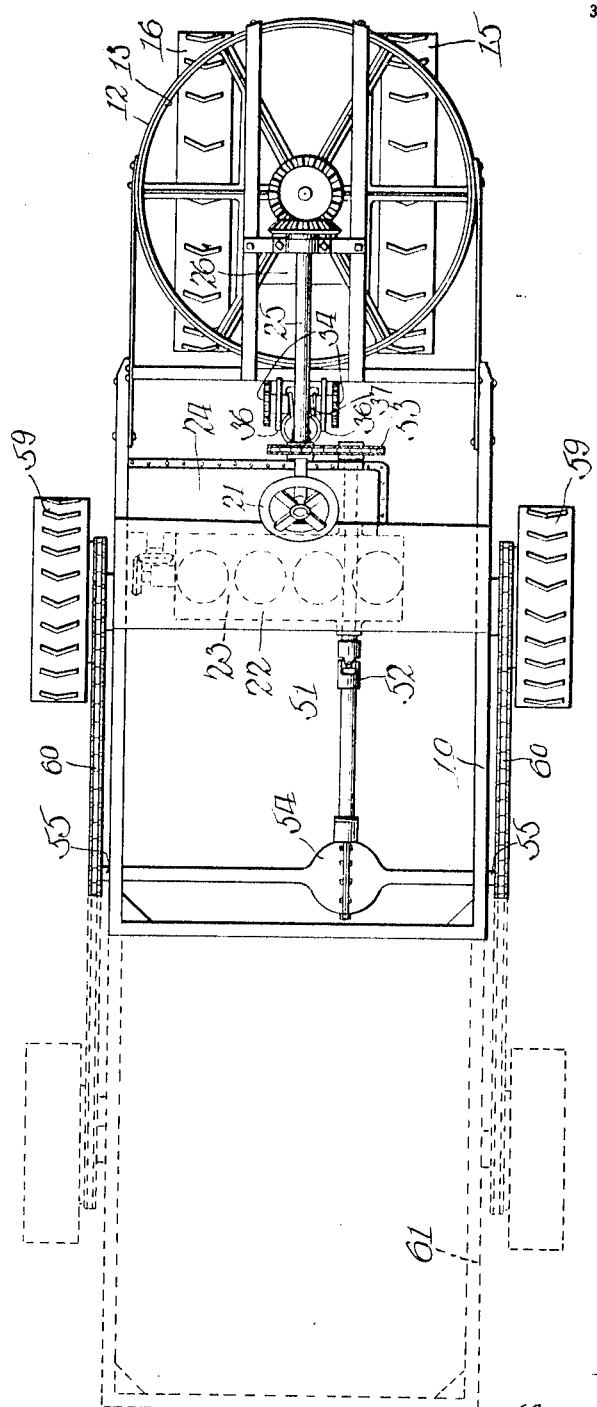

ERNST MEIS, OF PERU, ILLINOIS.

VEHICLE.

1,270,312.  Specification of Letters Patent.  Patented June 25, 1918.

Application filed October 29, 1917. Serial No. 198,925.

*To all whom it may concern:*

Be it known that I, ERNST MEIS, a subject of the Emperor of Germany, residing at Peru, in the county of La Salle and State of Illinois, have invented certain new and useful Improvements in Vehicles, of which the following is a specification.

My invention relates to power vehicles and is in the nature of an improvement on the vehicle described in United States Letters Patent No. 1,227,477 granted to me on May 22, 1917.

The primary object of the invention is the provision of an improved form of power steering mechanism.

A further object is the construction of improved power steering mechanism which shall permit the vehicle to be manually steered at will.

Another object is the provision of a common variable speed and reverse transmission mechanism for rear tractor wheels and power driven, front steering wheels, whereby all of said wheels shall have a uniform speed in the same direction at any given time, and separate rear and front differential gearings both driven from the common transmission, whereby the steering wheels may be permitted a greater arc of movement in turning than the rear wheels.

A still further object is the provision of a rear extension to the main frame of the vehicle and rear wheel bearings on both the main frame and the extension at equal distances from the axis of a rotatable power element on the main frame; by such an arrangement the transformation of the vehicle from a tractor to a truck is facilitated.

Other objects and advantages of the invention will appear from the following description taken in conjunction with the accompanying drawings which form a part of this specification and illustrate the preferred embodiment of the invention.

In the drawings:

Figure 1 is a side elevation of my invention showing in dotted lines the rearward frame extension and the power elements attached thereto.

Fig. 2 is a section taken substantially on line 2—2 of Fig. 3.

Fig. 3 is a detailed view, with parts broken away for clearness, of the steering mechanism seen in Fig. 1.

Fig. 4 is a plan view of the vehicle with parts broken away for clearness.

Reference numeral 10 indicates a main frame for the vehicle connected by webs 11 with an annular steering frame 12 in which is rotatably mounted a steering ring 13 carrying the bearings 14 for the power driven, front steering wheels 15 and 16. An annular beveled rack 17 is carried on the lower edge of the ring 13, and this meshes constantly with a bevel pinion 18 fixed on the lower end of a steering column 19. By turning the steering wheel 21 the steering ring 13 can always be turned.

Beneath the seat 22 is positioned an engine 23 which is connected to a variable speed and reverse transmission mechanism generally indicated at 24. From this transmission is driven a front power shaft 25 which, through a front differential gearing generally indicated at 26 and chains 27, drives the front wheels. Shaft 25 is preferably horizontal, and, at a point directly over the steering column 19, it carries a primary friction disk 28. In a suitably shaped frame piece 29 is journaled, at right angles to shaft 25, a worm shaft 31 extending equally on opposite sides of the shaft 25. Foot levers 32 are pivoted on this worm shaft near its outer ends, and are fitted, at their lower ends, with any desirable type of pedals, not shown. On the extreme outer ends of worm shaft 31 are fixed gear wheels 33 which are constantly in mesh with pinions 34 mounted on the outer ends of cross-shafts 35 journaled in the upper extremities of the foot levers. Secondary friction disks 36 are secured on the inner ends of the cross-shafts 35 and normally stand spaced from the primary disk 28 as seen in Fig. 3. By pressing either foot lever forward at its lower end it may be pivoted about the worm shaft 31 to bring its respective disk 36 into contact with the primary disk 28. Such contact, when the shaft 25 is turning, will rotate the worm pinion 37 fixed at the center of shaft 31 and which stands always in mesh with a worm gear 38 formed preferably integrally with a clutch member 39 rotatably mounted on the steering column 19. A second clutch member 41 is splined on the steering column just below the member 39, so that, when the clutch members are joined, the rotation of worm gear 38 turns the steering column. It will be seen that, as the secondary friction disks 36 are on opposite sides of the shaft 25 the steering column may be rotated in either direction according to which secondary disk is put in contact with the primary disk.

When either secondary disk is moved into contact with the primary disk, the invention contemplates a simultaneous joining of the clutch members 39 and 41. For this purpose member 41 is peripherally channeled as at 42. Pivoted as at 43, on a common axis in the frame piece 29 are two bell-cranks 44 the upper ends of which carry rollers 45 which lie in the channel 42. Somewhat below the pivots 43 links 46 are pivoted to the respective foot levers 32 as at 47, the ends of the links opposite the pivots 47 being slotted as at 48. The slots 48 are engaged by rollers 49 journaled on the lower ends of the bell-cranks 44. When either foot lever is pressed forward link 47 moves forward thus oscillating bell-crank 44 on pivot 43 and moving the splined clutch member 41 up into junction with the upper rotatable clutch member 39.

An ordinary type of driving shaft 51 (see Fig. 4) universally jointed as at 52, is connected through a chain 53 with the power shaft 25 and, in its turn, operates a rear differential generally indicated at 54. A discontinuous jack-shaft 55, near the rear end of the main frame 10, is driven from the rear differential. Forwardly of the jack-shaft 55, any suitable distance, a bearing hanger 56 is carried by the main frame in which is supported, on each side of the vehicle, a rear axle bearing 57 which holds a rear axle 58 upon which, at opposite ends, are journaled rear tractor wheels 59 each driven by a chain 60 from an end of the jack-shaft 55. An extension frame 61 is adapted to fit the rear end of main frame 10 and is secured thereto by any convenient means, the extension frame serving to greatly elongate the vehicle frame rearwardly. Half elliptical springs 62 are carried under the extension frame and these springs support another set of rear axle bearings 63. The bearings 57 and 63 are equidistant from the jack-shaft 55. The vehicle, as drawn in full lines on Fig. 1, is useful as a tractor for plowing or pulling work of any sort, but by the addition of the extension frame 61 and the transfer of rear axle 58 to the bearings 63 it is quickly changed into a truck upon which may be bolted, if desired, a truck body shown at 64 in dotted lines. As bearings 57 and 63 are equidistant from jack-shaft 55, the chain 60 requires no adjustment in length to accommodate itself to the truck arrangement, and the two sets of bearings may be of a type easily taken apart without removing the wheels 59 from the rear axle. Obviously the same end can be procured by leaving rear axle 58 in the bearings 57, providing another rear axle for bearings 63, and transferring the tractor wheels from one axle to the other, though the other arrangement appears preferable.

While the front wheels have their own differential gearing, and there is another similar gearing for the rear wheels (in order that the front wheels may swing easily through the wider arc they always describe in turning) it is to be noted that all the wheels are driven in a common direction at the same speed by reason of the fact that both differentials are controlled from a common variable speed and reverse transmission mechanism, 24.

While I have illustrated and described the preferred embodiment of my invention, it will be obvious that one skilled in the art may construct modifications thereof without departing from the spirit of the invention. I wish, therefore, not to be restricted to the precise embodiment shown except in so far as the same is limited in the appended claims.

I claim:

1. In a vehicle the combination with steering mechanism comprising a manually operable steering column, of a power shaft, a friction disk fixed thereon, a clutch member rotatable on said column, a worm gear fixed on said member, a clutch member splined on said column, a pedal lever, elements controlled by said lever for transmitting power from the power shaft to said worm gear, and devices for simultaneously joining said clutch members.

2. In a vehicle the combination with a steering column, of a clutch member rotatably mounted on the column, a clutch member splined on the column, duplicate bell cranks corresponding ends of which engage an annular channel formed in said splined clutch member, a foot lever for each bell-crank, and links connecting the opposite ends of said bell-cranks to their respective foot levers, the bell-cranks engaging slots provided in the links.

3. In a vehicle the combination with a manually operable steering column, and a power shaft, of a primary friction disk on the power shaft, a worm shaft at right angles to the power shaft, a pair of foot levers pivoted on the worm shaft, a cross shaft paralleling the worm shaft journaled in the upper end of each foot lever, a secondary friction disk fixed on the inner end of each cross shaft opposite the primary friction disk, a gear wheel fixed on each end of the worm shaft, a pinion on the outer end of each cross shaft meshing with one of said gear wheels, a clutch member rotatable on said column, a worm gear fixed on said member, a worm pinion on the worm shaft meshing with the worm gear, a clutch member splined on the steering column and annularly channeled, duplicate bell-cranks corresponding ends of which engage said channel, said bell-cranks being pivoted on a common axis, and links each slotted at one end and pivoted by the opposite end to one of the foot levers, the opposite ends of the bell-cranks being pivoted in the slots of said links.

In testimony whereof I have affixed my signature.

ERNST MEIS.